W. Q. OLDEN.
DUMP CAR.
APPLICATION FILED DEC. 24, 1908.

929,104.

Patented July 27, 1909.
7 SHEETS—SHEET 1.

W. Q. OLDEN.
DUMP CAR.
APPLICATION FILED DEC. 24, 1908.

929,104.  Patented July 27, 1909.
7 SHEETS—SHEET 5.

W. Q. OLDEN.
DUMP CAR.
APPLICATION FILED DEC. 24, 1908.

929,104.

Patented July 27, 1909.
7 SHEETS—SHEET 6.

W. Q. OLDEN.
DUMP CAR.
APPLICATION FILED DEC. 24, 1908.

929,104.

Patented July 27, 1909.
7 SHEETS—SHEET 7.

Witnesses:

Inventor:
William Q. Olden.
By Bond, Adams, Pickard & Jackson
his Attys

UNITED STATES PATENT OFFICE.

WILLIAM Q. OLDEN, OF CHICAGO, ILLINOIS, ASSIGNOR OF ONE-HALF TO HIMSELF, AND ONE-HALF TO ROBERT B. CAMPBELL, OF JOLIET, ILLINOIS.

DUMP-CAR.

No. 929,104.   Specification of Letters Patent.   Patented July 27, 1909.

Application filed December 24, 1908. Serial No. 469,042.

*To all whom it may concern:*

Be it known that I, WILLIAM Q. OLDEN, a citizen of the United States, residing at Chicago, in the county of Cook, State of Illinois, have invented certain new and useful Improvements in Dump-Cars, of which the following is a specification, reference being had to the accompanying drawings.

This invention relates to improvements in dump cars of the type having one or more large central openings toward which inclined end and side walls lead, the said openings being each closed by a pair of swinging doors hinged along the longitudinal center of the car so that when opened the load will be dumped at the sides of the car.

The objects of my invention are to provide improved means for opening and closing such doors; to provide means for effecting the secure locking of the doors in their closed position; to provide means whereby the door or doors on one side may be opened independently of the door or doors on the other side or both the doors on both sides may be unlocked and dropped simultaneously; to provide means for keeping the lifting chains for the doors taut at all times; and to improve generally the construction and operation of devices of this general character. I accomplish these objects by the means shown in the drawings and hereinafter specifically described.

That which I believe to be new will be set forth in the claims.

In the drawings.

Referring to the several figures of the drawings, in which corresponding parts are indicated by like reference characters:—20 indicates the side sills of the car, preferably formed of heavy channel pieces.

Figure 7:
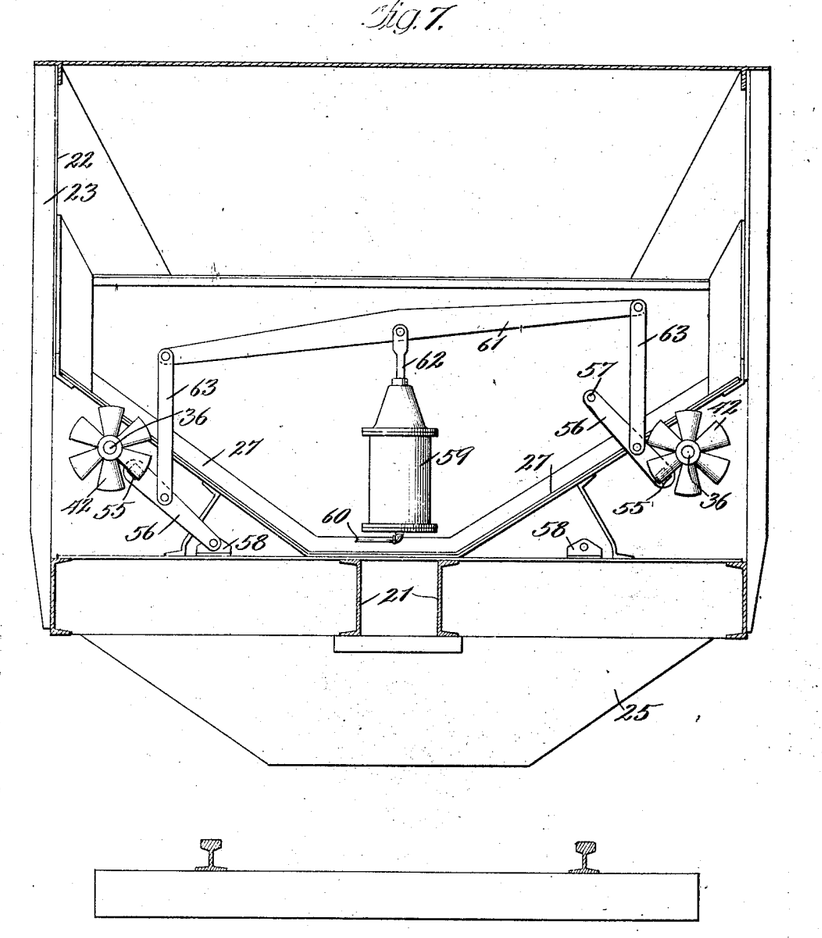
Figure 8:
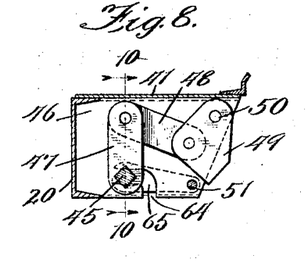
Fig. 8 is a detail of one of the door latches and a part of the mechanism for operating the same, the latch being in inoperative position.

21 indicates the central sill, made also of channel pieces, said sill being formed, as shown in Fig. 7, of two such pieces placed a distance apart. This center sill is not continuous from end to end, as it does not extend across the delivery openings in the bottom of the car.

22 indicates the sides of the car, said sides being preferably formed of a number of plates of steel suitably riveted together and held a distance above and parallel with the side sills 20 by a series of steel angle bars 23 and channel bars 24, two of such channel bars being employed at each side, one near each end of the car.

Figure 6:
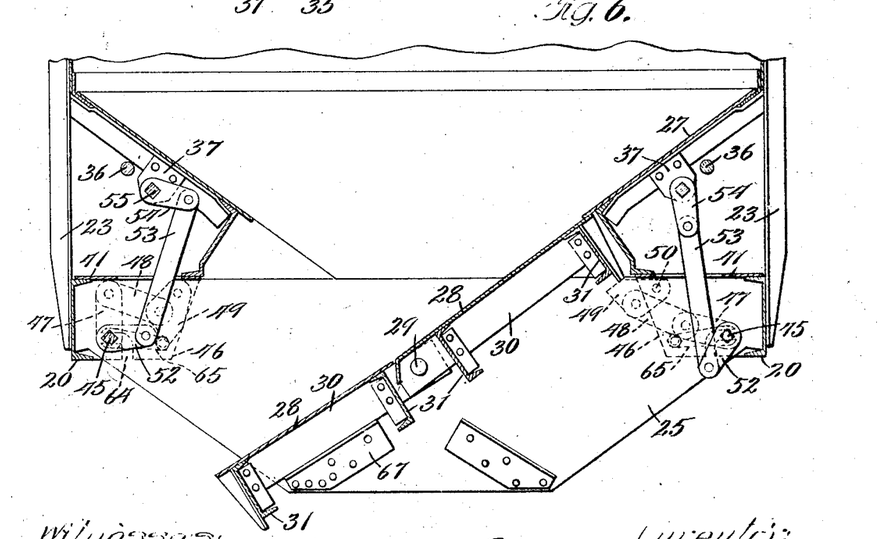

25 indicates four wide heavy girders extending across between the side sills 20 to which they are suitably riveted, the upper edges of such girders being substantially flush with the upper edges of the side sills. As shown in Figs. 6 and 7, these girders extend a considerable distance below the sills of the car and at their ends are inclined from the side sills inward. These girders are at opposite ends of the discharge openings in the floor of the car, through which openings the material in the car is discharged when the swinging doors hereinafter more specifically referred to are opened, and, when such doors are opened, said girders form effective guards for preventing the material that is being dumped from passing off at the sides of the lowered doors, the doors and these girders thus forming in effect discharge chutes for the material, as will be well understood.

In the form of construction shown, the car, which is a very long one, is divided centrally so as to provide two large separate compartments, each extending from one end of the car to this central division wall, and in each compartment are inclined plates forming the floor of the car, the end inclined portions of the floor being indicated by 26 and the side inclined portions by 27. In the bottom of each compartment is formed a large opening normally closed by two swinging doors, the upper face of each of which is composed of a steel sheet or sheets, said upper surface being indicated by 28. These doors are formed exactly alike, except that the portion 28 of one door of each pair is wider than the other so as to always extend over the central joint, as clearly seen in Fig. 6. A pair of these doors is provided for each of the discharge openings, each pair being pivoted on suitable studs or heavy pins suitably secured in the adjacent girders 25, said pins passing through end bars 30 forming part of each door and to which the plates 28 of the door are suitably secured along their ends. The supporting framework of each door to which the plates 28 are secured comprises end bars 30, intermediate cross bars 30ª and longitudinally-extending bars 31. To each of the intermediate bars 30ª of each door I rivet a bar, preferably of angle iron, indicated by 32, which bars project for a considerable distance below the door proper, the two bars 32 of each door being suitably braced together by braces 33.

Figure 3:
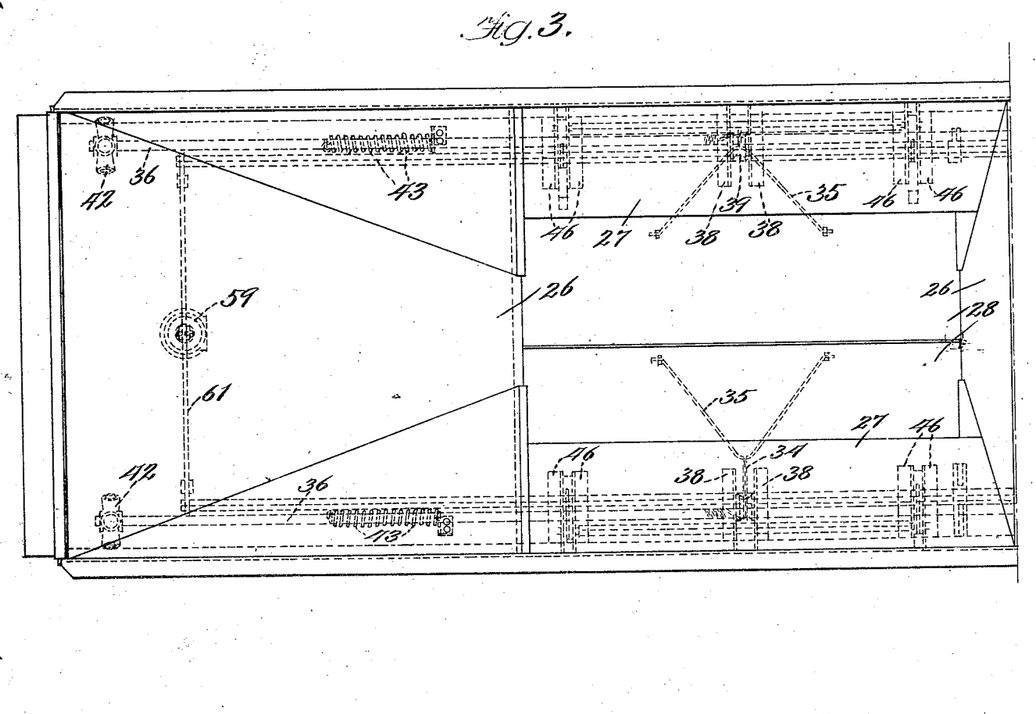
Figs. 3 and 4 together constitute a plan view of such car.
Figure 4:
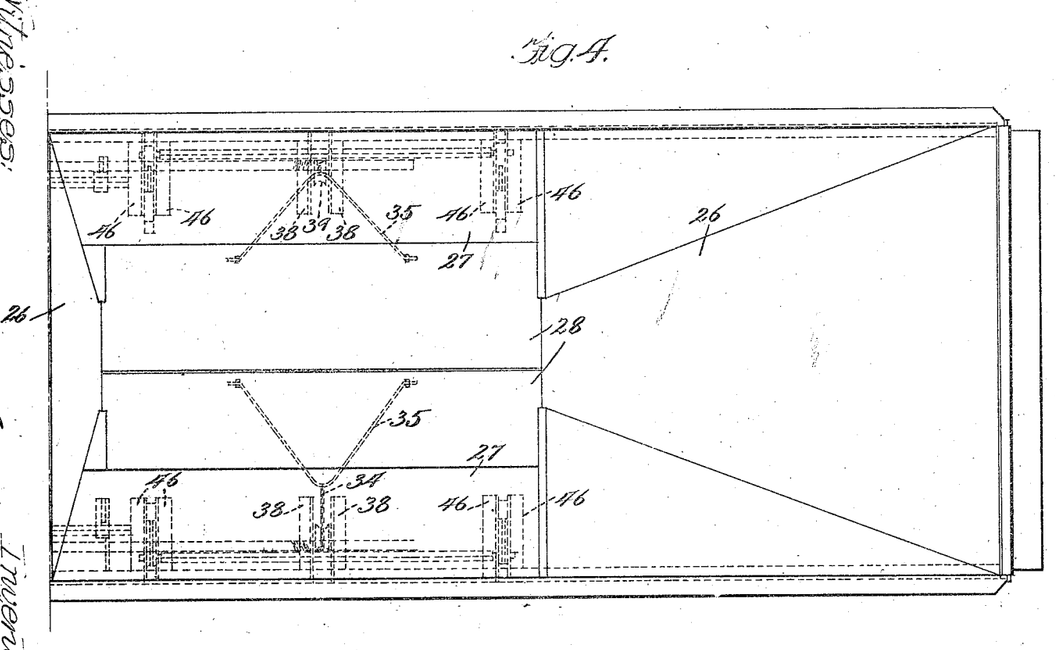

The construction described provides a rigid framework depending from and secured to each door, insuring the equal distribution of the strain incident to raising the door so that such door will always be moved properly from lowered to raised position and with a minimum amount of binding or friction on its pivotal bearings. To each door I attach a lifting chain 34, the connection of such chain to the door being, in the construction shown, through the medium of a swinging bail 35, the ends of said bail being turned and inserted through the depending bars 32 near the lower ends thereof and the lifting chain 34 being attached to such bail substantially centrally thereof, as clearly shown in Figs. 1 and 2, and as indicated by dotted lines in Figs. 3 and 4.

The lifting chain 34 is connected at its upper end to a shaft 36 located at one side of the car and extending longitudinally thereof, around which shaft the chain is adapted to be wound to cause a raising of the door. There are two of these shafts 36, one at each side of the car, each extending from near one end of the car to a sufficient distance toward the other end to adapt it to receive both of the lifting chains 34 at that side of the car.

As its only purpose is to cause the two chains at that side to be wound up for the purpose stated, it of course is not necessary to extend the shaft through to both ends of the car.

As the devices at each side of the car are exactly the same, a description of the construction and operation of one side will be understood as applying for both sides.

37 indicates short strips riveted in place beneath the inclined side portions of the car floor, in which strips the shaft 36 is journaled.

38 indicates short pieces of channel iron projecting out from the inner faces of the side sills 20 to which they are suitably riveted, a pair of such short channel irons being located opposite the central portion of each door and having journaled between them a roller 39 over which the lifting chain 34 of the adjacent door is led. This chain passes through a suitable opening 40 in a long plate 41 that extends from end to end of the car at the side of the car, and which is supported upon and suitably secured to the upper edge of the side sill and the upper edge of the girders 25. At that end of the shaft 36 that extends to near one end of the car is affixed a capstan 42 adapted to be turned by a suitable bar inserted in one of its sockets, and which, when so turned, will cause a rotation of the said shaft 36 and the consequent winding up of the two chains 34 that are affixed at one end to it, which will raise both the doors connected through such chains and their respective bails so as to close the opening through which material has been discharged from the car. These chains are not intended to support the doors in their raised position, but the same will be supported by separate locking devices, the construction and method of operation of which will be hereinafter described.

Figure 5:
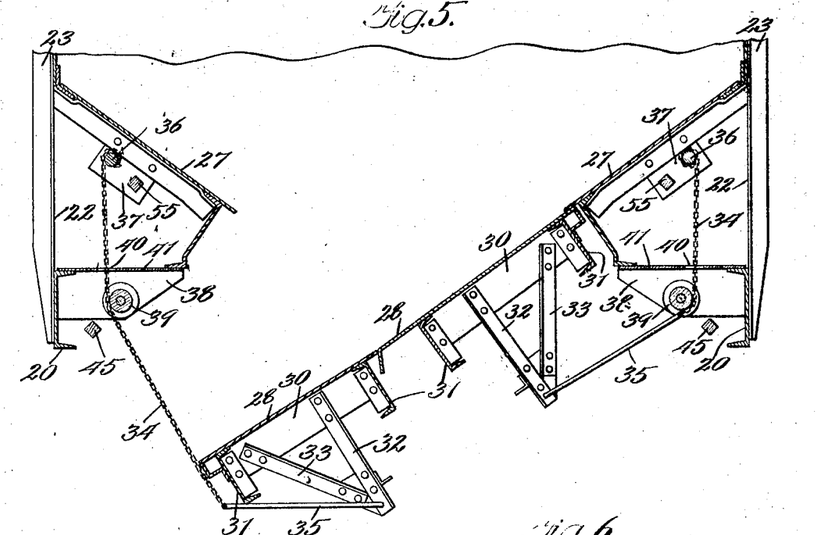
Figs. 5, 6 and 7 are vertical sections taken at lines 5—5, 6—6, and 7—7, respectively, of Figs. 1 and 2.

43 indicates a coiled spring on the shaft 36, one end of the same being fixedly secured to a small bracket 44 attached to the body of the car and the other end being attached to the shaft. This spring tends constantly to rotate its shaft in a direction to wind up the lifting chains 34 that are connected to the shaft, and the spring will ordinarily be under greatest tension when the shaft has been rotated to permit the doors to drop to discharging position. The spring, while a fairly strong one, is not strong enough and is not intended to be strong enough to exert a sufficient force upon the shaft to overcome the weight of the doors, but will always be sufficient to take up any slack in the chain when the doors are down, as well as to keep the respective bails 35 connected to such chains held raised against the door-frames, as well shown in Fig. 5, thus preventing the bails from at any time falling in contact with the ground, and holding them up during the discharge of the load. When the doors are raised to close the discharge openings in the bottom of the car, the springs will be under less tension than when the doors are lowered, but will still retain enough power to rotate the shafts sufficiently to wind up the slack of the chains thereby preventing them from swinging and rattling while the car is in motion.

Figure 9:
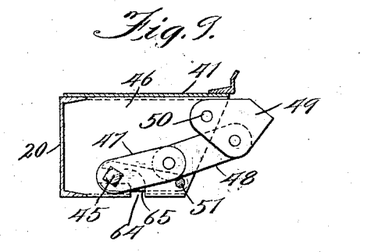
Fig. 9 is a view of the same parts with the latch in position to hold the door locked in closed position.
Figure 11:
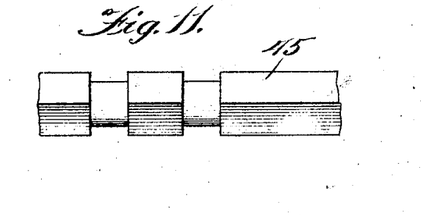
Fig. 11 is an enlarged detail of a portion of the rock-shaft through which the door-locking mechanism at one side of the car is operated.
Figure 12:
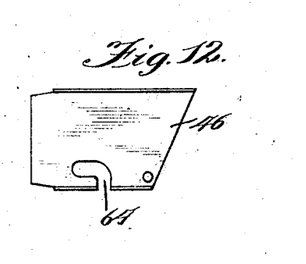
Fig. 12 is an enlarged detail, being a side elevation of one of the supports in which the rock-shaft above referred to is journaled.
Figure 13:
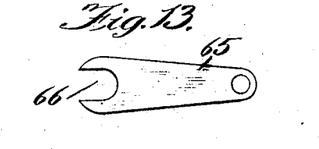
Fig. 13 is an enlarged detail of one of the dogs that hold the said rock-shaft in place.

Referring now to the means employed for locking the doors securely in place when in their raised position, and for releasing such locking mechanism, 45 indicates a shaft, preferably angular in cross section, as shown, except at its bearing portions, one of such shafts being provided for each door and being of a length substantially the same as the length of the door. Each of these shafts is suitably journaled near its ends in a pair of brackets 46 formed of short sections of channel iron that are secured near the inner face of one of the side sills 20. The portion of the shaft 45 between the channel iron pieces 46 is squared or angular, as is clearly indicated in Fig. 11, where the bearing portions of the shaft are shown, and to this squared portion between the bearings is secured one end of a link 47 between the forked upper end of which is pivotally attached another link 48 which at its other end is pivotally attached to an irregular-shaped block 49 that constitutes the holding latch proper, said latch itself being pivoted to a pin 50, the ends of which are secured in the channel iron supports 46. The links 47—48 together form a pair of toggle arms which when forced to bring them into nearly a straight line will act to force the latch 49 out into holding position beneath the edge of the door, such toggle arms being then supported, as clearly shown in Fig. 9, by a pin 51 that is secured to the supporting channel irons 46. As stated, there is a pair of these supporting channel irons near each end of a door, and a latch and its operating links are provided in connection with each set of supporting devices and consequently the door will be latched and firmly supported near each of its ends.

Figure 1:
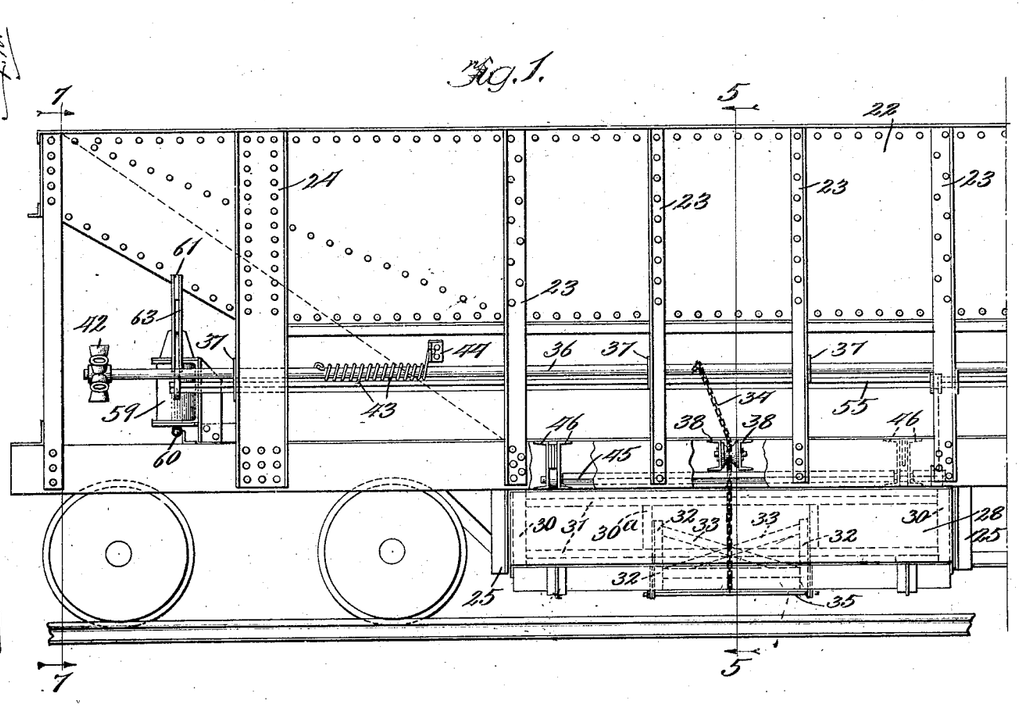
—Figures 1 and 2 together constitute a side elevation of a car embodying my improvements, a portion of the frame work being broken away in each figure to show some of the door-operating mechanism.
Figure 2:
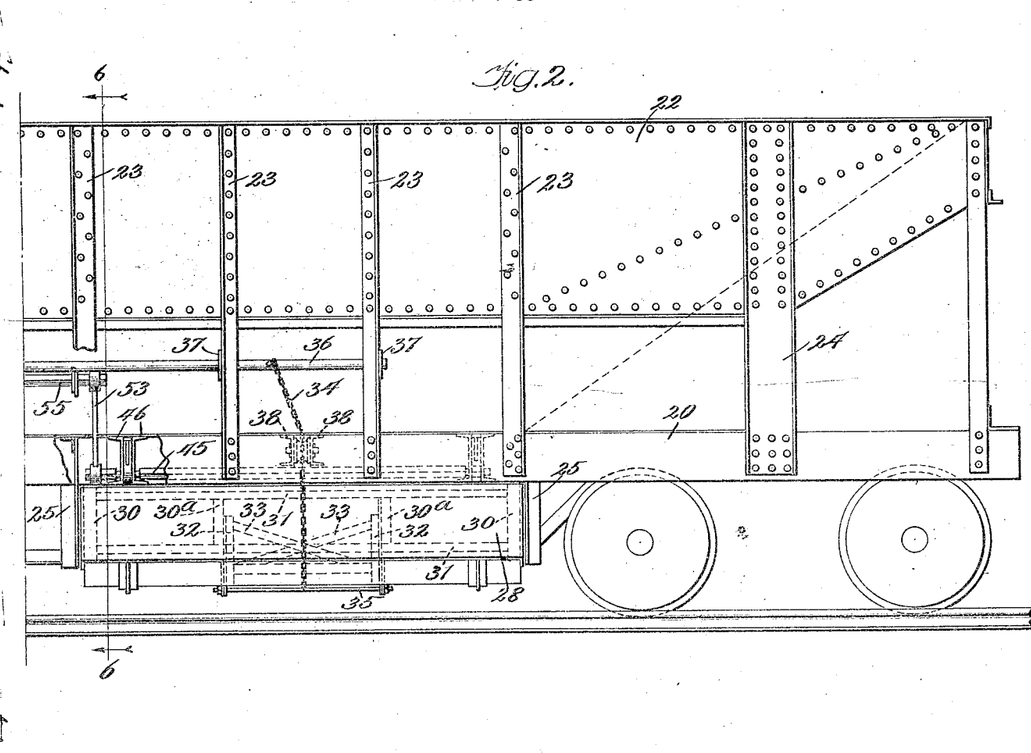

As shown in Fig. 2, where the side sill of the car is broken away, and as indicated by dotted lines in Fig. 1, each angular shaft 45 projects at one of its ends beyond one of its sets of supports and to such projecting and angular end is fitted a short link 52 by the turning of which said shaft will be caused to rotate. This link has pivoted to its other end the lower end of an arm 53, to the upper end of which is pivotally attached a link 54 that is also connected to a rock-shaft 55, said rock-shaft being preferably angular, except of course at its bearing portions. This rock-shaft 55 is supported in some of the strips 37 in which are journaled the shaft 36. The arm 53 and the link 54 pivoted to it also constitute a pair of toggle members. Each rock-shaft 55 projects over one end of the car so that, like its adjacent shaft 36, it will be easily accessible by the operator. At this projecting end, it has secured upon it an operating lever 56 which can be grasped by the operator and moved to rock the shaft. The end of this lever is provided with a hole 57 through which a key or pin can be passed and also passed through a corresponding hole in a small bracket 58 secured to the supporting framework of the car, whereby the lever can be locked down to prevent any possibility of accidental displacement.

59 indicates an air cylinder at the end of the car over the longitudinal center thereof to which an air pipe 60 leads so that air pressure controlled by the engineer of the train may be employed to force up the usual piston in such cylinder.

61 indicates a cross head centrally pivoted to the rod 62 connected with the piston in said cylinder.

63 indicates a link at each end of said cross head and pivotally connected therewith, the lower end of each link being pivotally connected to one of the levers 56. It is evident that if both of these levers 56 be disconnected or unlocked from their connection with the brackets 58, that the upward movement of the piston-rod, carrying with it of course the cross head 61, will pull up the levers 56 and turn both of the rock-shafts. If, however, only one rock-shaft is to be turned, the lever 56 that is connected with the other rock-shaft will be left locked down, as shown in Fig. 7.

Figure 10:
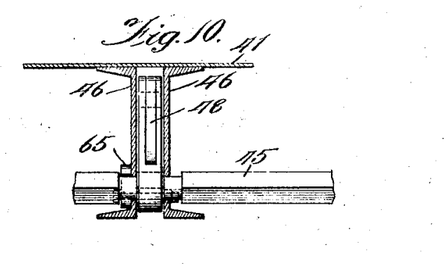
Fig. 10 is an edge view of the devices of Fig. 8, the supporting parts for such devices being in section, the section being taken on line 10—10 of Fig. 8.

In order to provide for the ready and comparatively easy detachment and replacement of the shafts 45 that carry the door latches and the parts immediately connected therewith, I form in the lower edges of the pairs of supporting members 46 curved slots 64, into the lower open ends of which the bearing portions of the shafts 45 can be entered and the shafts then pushed so that they rest at the closed ends of said slots. It is then of course necessary to lock the shaft in place against sliding out of said slots, and I do this by means of a dog 65 having at its larger and shaft-engaging end a wide notch 66 of a size and shape to receive the bearing portion of the shaft. This dog is located alongside one of each pair of short angleirons 46, as clearly shown in Fig. 10, and after it has been placed in position so as to engage the shaft as stated, it is secured at its other end by the pin 51 that also acts as a stop for the pair of toggle levers 47—48. It is evident that in case of any necessity arising for replacing one of the latches or any of the parts immediately connected therewith, the shaft 45 can be very quickly removed by withdrawing the pins 51, thus releasing the dogs 65 and allowing the shaft to be pulled out through the lower ends of said curved slots.

With a car loaded with material which is desired to be dumped, the operator will disconnect that one of the levers 56 from its engagement with its bracket 58 that is at that side of the car at which the dumping is to be performed. Or, if dumping is to be performed at both sides, then of course both levers will be disconnected. Either or both of the rock-shafts 55 are now to be turned, either by use of air controlled from the engine as described,—in which event dumping can be simultaneously performed at both sides if both levers are unlocked, or at that side where but one lever is unlocked, or can be performed independent of the power device by the operator pulling up by hand either or both of the actuating levers. The effect of such turning of the rock-shaft 55 is to break the toggle composed of the members 53—54 and of course causing an upward pull on the member 53, which pulls up the link 52, breaking the toggle formed by the members 47—48 and drawing back the pivoted latch 49 with which the toggle member 48 is pivotally engaged. The withdrawal of the latch of course allows the door, under whose edge it has rested, to drop. The downward movement of the door is arrested by heavy angleirons 67, riveted to the girders 25. As the chains 34 unwind from their shaft 36, the coiled spring on said shaft has its tension increased, and, as stated, will hold the bail 35 as shown at the left-hand side of Fig. 5, thus keeping it clear of the ground or road-bed. After the load has been discharged, the lowered gates are raised by winding up the chains on said shaft 36, such shaft being rotated by the aid of the capstan 42 as above explained. After the doors have been brought to their uppermost position to close the discharge opening, the operator by pulling up on the proper hand-lever 56, will rock the shaft 55 and such rocking will straighten out the toggle members 53—54 so that they are just slightly out of alinement, as seen at the right-hand side of Fig. 6, and this movement will also straighten out the other set of toggle members 47—48, they also just passing beyond perfect alinement, and, by reason of their contact with and stoppage by the pin 51, they will be held locked in this position. The motion imparted to these parts to bring them into the positions described, will throw the latch pivoted to the end of the link member 48 under the edge of the raised door and the door will thereby be securely locked. As before explained, the coiled spring 43 will still retain enough power to keep the lifting chains 34 wound on the shaft sufficiently to prevent any slack.

By this construction, it is evident that the lifting chains are lifting chains only, and that after having performed their function they do not in any manner assist in holding up the doors but that on the contrary the doors are supported wholly by the latches described and thereby the doors are held much more securely and evenly than if reliance were placed upon the lifting chains for such purpose.

By providing each door with the downwardly extending framework located between the front and rear edges of the door, and securing to the lower end of such framework the pivoted bail described to which a lifting chain is attached, I apply the lifting power said to be more evenly distributed the whole length of the door, thereby causing it to swing easily and with a minimum amount of friction on its pivots, and I secure the application of the power at an advantageous point for leverage purposes.

What I claim as my invention and desire to secure by Letters Patent is:—

1. In a dump car having a discharge opening, the combination with a pivoted door for said opening and a lifting chain therefor, of a rotatable shaft on which said chain winds and automatically-acting means tending to rotate said shaft sufficiently to take up any slack in the chain when said door is open.

2. In a dump car having a discharge opening, the combination with a pivoted door for said opening and a lifting chain therefor, of a rotatable shaft on which said chain winds and automatically-acting means tending to rotate said shaft sufficiently to take up any slack in the chain when said door is closed.

3. In a dump car having a discharge opening, the combination with a pivoted door for said opening and a lifting chain therefor, of a rotatable shaft on which said chain winds and automatically-acting means tending to rotate said shaft sufficiently to take up any slack in the chain when said door is in either its open or its closed position.

4. In a dump car having a discharge opening, the combination with a pivoted door for said opening and a lifting chain therefor, of a rotatable shaft on which said chain winds, and a coiled spring secured at one end to said shaft and secured at its other end to a fixed support, said spring exerting a force on said shaft sufficient to keep the chain free from slack but not sufficient to cause a closing of the door.

5. In a dump car having a discharge opening, the combination with a pivoted door for said opening, and a pivoted bail secured to the under part of said door, of a lifting chain connected with said bail and a rotatable shaft on which said chain winds.

6. In a dump car having a discharge opening, the combination with a pivoted door for said opening and a pivoted bail secured to the under part of said door, of a lifting chain connected with said bail, a rotatable shaft on which said chain winds, and automatically-acting means tending to rotate said shaft sufficiently to hold up said bail and take up any slack in the chain.

7. In a dump car having a discharge opening, the combination with a pivoted door for said opening, a depending framework secured to the under face of the door, and a pivoted device secured to the said framework, of a lifting chain connected with said pivoted device, and a rotatable shaft on which said chain winds.

8. In a dump car having a discharge opening, the combination with a pivoted door for said opening, a depending framework secured to the under face of the door, and a pivoted device secured to the said framework, of a lifting chain connected with said pivoted device, a rotatable shaft on which said chain winds, and automatically-acting means tending to rotate said shaft sufficiently to hold up said pivoted device and take up any slack in the chain.

9. In a side-dump car, the combination with a pivoted door and means for moving it into closed position, of a latch adapted to engage the free edge of the door, a rock-shaft suitably journaled in place near the side of the car and in proximity to said door, means connecting said rock-shaft and latch whereby said latch will be turned by the rocking of said shaft, a second rock-shaft extending to near one end of the car and provided with an operating device, and means connecting said two rock-shafts.

10. In a side-dump car, the combination with a pivoted door and means for moving it into closed position, of a latch adapted to engage the free edge of the door, a rock-shaft suitably journaled in place near the side of the car and in proximity to said door, means connecting said rock-shaft and latch whereby said latch will be turned by the rocking of said shaft, a second rock-shaft extending to near one end of the car and provided with an operating device, and a pair of toggle members connecting said two rock-shafts.

11. In a side-dump car, the combination with a pivoted door and means for moving it into closed position, of a latch adapted to engage the free edge of the door, a rock-shaft suitably journaled in place near the side of the car and in proximity to such door, a pair of toggle members connecting said rock-shaft and latch, a second rock-shaft, and means connecting said two rock-shafts.

12. In a side-dump car, the combination with a pivoted door and means for moving it into closed position, of a latch adapted to engage the free edge of the door, a rock-shaft suitably journaled in place near the side of the car and in proximity to such door, a pair of toggle members connecting said rock-shaft and latch, a second rock-shaft, and means connecting said two rock-shafts, said connecting means comprising two other toggle members.

13. In a side-dump car, the combination with a pivoted door and means for moving it into closed position, of a latch adapted to engage the free edge of the door, a double walled inclosing device in which said latch is located and to which it is pivotally secured, a rock-shaft passing through and journaled in said inclosing device, means also within said inclosing device for connecting said rock-shaft and latch, a second rock-shaft, and means connecting said two rock-shafts together.

14. In a side-dump car, the combination with a pivoted door and means for moving it into closed position, of a latch adapted to engage the free edge of the door, a double walled inclosing device in which said latch is located and to which it is pivotally secured, lever mechanism also located in and pivotally connected to said inclosing device and pivotally connected to said latch, a rock-shaft passing through and journaled in said inclosing device and connected with said lever mechanism, a second rock-shaft, and means connecting said two rock-shafts together.

15. In a side-dump car, the combination with a pivoted door and means for moving it into closed position, of a latch adapted to hold the door in such position, a rock-shaft, means for connecting said rock-shaft and latch so that said latch will be moved by the rocking of said shaft, a supporting plate in which said shaft is journaled, said plate having a slot to receive said shaft, and a movable locking piece adapted to bear against said shaft to hold it in place in said slot.

16. In a dump-car the combination with a pair of swinging doors adapted to discharge material from the car at opposite sides of the car, and means for separately locking said doors in closed position, of an operating rock-shaft at each side of the car, with each of which one of said sets of locking means is connected, each of said rock-shafts extending to near one end of the car, an operating lever connected to each of said rock-shafts, a cross-head connecting said levers, and power mechanism for moving said cross-head.

17. In a dump-car, the combination with a pair of swinging doors adapted to discharge material from the car at opposite sides of the car, and means for separately locking said doors in closed position, of an operating rock-shaft at each side of the car, with each of which one of said sets of locking means is connected, each of said rock-shafts extending to near one end of the car, an operating lever connected to each of said rock-shafts, a cross-head connecting said levers, power mechanism for moving said cross-head, and means for separately locking either or both of said levers against turning.

WILLIAM Q. OLDEN.

Witnesses:
ALBERT H. ADAMS,
W. H. DE BUSK.